Patented July 12, 1938

2,123,806

UNITED STATES PATENT OFFICE 2,123,806

CELLULOSE ESTERS

George W. Rigby, Wilmington, Del., assignor to E. I. du Pont de Nemours & Company, Wilmington, Del., a corporation of Delaware No Drawing. Application September 19, 1934, Serial No. 744,665

18 Claims. (Cl. 260—100)

This invention relates to a new, dry, reactive form of alkali cellulose, to a method for its preparation, and to its use in making various cellulose derivatives, particularly cellulose esters of organic sulfonic acids.

This invention has as an object a dry alkali cellulose having alkali dispersed uniformly thruout in a form approaching molecular, and to a method for its preparation. A further object is the preparation of various cellulose esters and ethers from this intermediate. Particular objects are (1) the provision of a process whereby highly substituted, substantially undegraded organic solvent soluble cellulose esters of organic sulfonic acids may be prepared; (2) the preparation of substantially undegraded cellulose esters of organic sulfonic acids which contain more than one sulfonic acid group per glucose residue; and (3) the class of new esters thus prepared. Other objects will appear hereinafter.

These objects are accomplished by the following invention wherein a substance having the cellulosic nucleus and containing esterifiable hydroxyl groups is first treated with an aqueous solution of at least one mol. of sodium hydroxide (or equivalent of other inorganic base) per mol. of esterifiable hydroxyl, the concentration of the alkaline solution being such that there are present not more than 20 mols of water per mol. of cellulosic substance (celluose being calculated as $C_6H_{10}O_5$). This product is then suspended in or covered by liquid ammonia and metallic sodium added in amount sufficient to react with all the water, the ammonia finally being allowed to evaporate. The resulting dry reactive alkali cellulose may be reacted with various esterifying and etherifying agents to make a wide variety of cellulose derivatives. Another method of making the above alkali cellulose is to treat a mixture of cellulose, water, and liquid ammonia with metallic sodium, and to evaporate the ammonia, the last traces from toluene suspension.

The product by either method is a toluene suspension of a new alkali cellulose, highly useful in making cellulose ethers and esters because of the smooth, rapid, yet readily controllable nature of their formation. The new alkali cellulose can be described as a dry, reactive, undegraded alkali cellulose having a very large amount of alkali distributed in very uniform fashion thruout, in a form approaching molecular. By no other known means can this product be prepared; not even by grinding dry alkali and dry cellulose can such an intimately mixed dry product having such a high amount of alkali present therein in such finely divided form be obtained.

Particular cellulose esters which are advantageously prepared from the above intermediate are the organic sulfonates, the sulfonic acid halide being used as the other ester forming component. In making these esters it is essential that the molal ratio of the sulfon halide to alkali (as added to the cellulose originally and as formed in the ammonia treatment) be greater than one to one. It is also essential, in order to suppress undesirable side reactions and to prevent degradation of the cellulosic structure, that the reaction temperature be kept at approximately room temperature, preferably below, (at or near 0° C.), until the initial exothermic reaction abates. The critical nature of these procedural details for making cellulose sulfonates has not to my knowledge heretofore been disclosed or realized in the prior art. The advantages of following these details are also realized if the alkali cellulose is not of the particular type discussed above, and certain of the examples which follow illustrate this point.

In the preferred form of the invention, cotton linters are steeped for one hour at 20° C. in 40% sodium hydroxide and pressed to 4.7 times the original weight. The alkali cellulose thus prepared contains 33.5% sodium hydroxide. It is covered with liquid ammonia and metallic sodium is added until substantially all the water has been removed by reaction with the sodium. Most of the ammonia is then evaporated and the cellulose is covered with dry toluene and heated until the remaining ammonia is all driven off.

Cellulose p-toluenesulfonate is made from the above toluene suspension of dry alkali cellulose as follows: A quantity of p-toluenesulfonyl chloride greater than the equivalent of the caustic present is introduced and the mixture cooled while the major portion of the reaction takes place. Then the temperature is raised to about 100° C. for 30 minutes. The reaction product is filtered off and the solid extracted with methanol until free from chloride. It is then washed with water until free from all salts. The cellulose p-toluenesulfonate thus prepared is dissolved in hot acetone and filtered free from insoluble material. The acetone solution is concentrated and formed into a film or filament or is poured into a non-solvent such as water, ether, or methanol and the precipitated solid filtered off and washed with water to remove any adhering salt. The product is soluble in such solvents as acetone, ethyl acetate, and mixtures of chloroform and alcohol, but is insoluble in chloroform, and benzene. The ester usually contains from 1 to 2 ester groups per glucose residue altho under certain conditions more than 2 ester groups may be introduced.

Having outlined above the principle and purposes of the invention and giving a preferred exemplification thereof, the following examples are added for purposes of illustration and not in limitation:

Example 1

Eighty-one parts of cellulose was steeped for one hour at 20° C., in 40% sodium hydroxide, pressed to 374 parts and shredded to very fine particles. Sixteen and two-tenths parts of the alkali cellulose thus prepared was mixed with 100 parts of liquid ammonia to which had been added 2.23 parts of metallic sodium. As soon as the blue color of the metallic sodium had disappeared, the ammonia was evaporated off, 100 parts of toluene was added, and the mixture heated to 100° C. to drive off any excess ammonia. The toluene suspension of alkali cellulose thus produced was cooled to 20° C. and 52.2 parts of p-toluenesulfonyl chloride was added, care being taken that the temperature did not rise above 30° C. As soon as the main (strongly exothermic) part of the reaction had taken place the mixture was heated to 100° C. for 5 hours. The toluene was poured off and the solid washed first with ether to remove toluene and p-toluenesulfonyl chloride, then with water until free from salt. The solid was then dried and dissolved in acetone. The acetone solution, after filtering, was precipitated in methyl alcohol, and the solid dried, and analyzed. The product from one such experiment contained 39.5% sulfur calculated as sulfuric acid. This corresponds to 1.7 ester groups per $C_6$. The acetone solution can be directly cast into a film or filament of good strength.

The above example utilized a native cellulose which had suffered no solubilizing treatment prior to reaction. The use of sodium in liquid ammonia allowed the ratio of 11 mols of sodium hydroxide to 8 mols of water to one mol. of cellulose to be maintained. It is practically impossible to obtain this ratio by other means since even grinding solid sodium hydroxide with the driest alkali cellulose does not give the intimate mixture which is easily obtained by the method of the above example.

The ratio of p-toluenesulfonyl chloride to caustic used above is highly critical as otherwise a highly degraded useless product is obtained. At least one mol. of p-toluenesulfonyl chloride must be used per mol. of sodium hydroxide, and preferably as much as 6 to 8 mols of p-toluenesulfonyl chloride per mol. of sodium hydroxide. While the example calls for a molal ratio of 1:1 it has been found advisable to use more than this ratio as will be discussed later. To obtain maximum esterification and utilization of reagents, it is essential that the first and major part of the reaction be carried out below room temperature, as for example, from $-10°$ C. to 25° C.

The two competing reactions:

(1) $R'SO_2Cl + NaOR \rightarrow R'SO_2\text{—}O\text{—}R + NaCl$ and
(2) $R'SO_2Cl + 2NaOH \rightarrow R'SO_2ONa + NaCl + H_2O$ are affected differently by temperature, the second having a much higher temperature coefficient than the first reaction. For this reason it is economical of reagents to use comparatively low temperatures for the first part of the reaction. The final stages of esterification are advantageously pushed by raising the temperature to about 100° C. for a short time.

While in the above example toluene was used as the diluent, it may be replaced by benzene, nitrobenzene, di-n-butyl ether, dibenzyl ether and dioxane. Dioxane is, in many respects, superior to toluene as a diluent for it is simultaneously a solvent for the ester and a diluent for the reesterification by continually exposing a new surface of the alkali cellulose for reaction with the sulfonyl chloride.

Example 2

One hundred and ninety parts of alkali cellulose (containing 21.2% cellulose and 31.3% sodium hydroxide) was mixed with a solution of 356 parts of p-toluenesulfonyl chloride in 500 parts of ether and the suspension cooled to 2° C. The temperature was maintained at 2° C. for 48 hours, then raised to the boiling point of ether for 1 hour. After distilling off the ether, the solid was filtered off and washed with water until halogen-free. The yield was 82 parts of pure white ester, most of which was soluble in acetone and analyzed for 1.85 ester groups per glucose unit.

The above experiment exemplifies a combination of low temperature for the main reaction, followed by a completed reaction at above 35° C. Furthermore, a ratio of p-toluenesulfonyl chloride to sodium hydroxide of 12.5:1 was used. Under essentially the same conditions, but using only 0.5 mol. of p-toluenesulfonyl chloride per mol. of sodium hydroxide, practically no esterification took place, the yield of product being no greater than the amount of cellulose taken.

In a series of three experiments using the proportions of reagents of 1 mol. of cellulose, 5.96 mols of sodium hydroxide, 20 mols of water, and 7 mols of p-toluenesulfonyl chloride but in which different initial temperatures of reaction were employed, it was found that there were introduced 1.49 ester groups per glucose residue at 0°C., 1.3 at 20° C., and 0.73 at 80° C. These results quite definitely illustrate the advantage of using low temperatures in preparing cellulose p-toluenesulfonate from alkali cellulose and p-toluenesulfonyl chloride.

Example 3

Four hundred and five parts of cellulose was steeped in 50% potassium hydroxide for 1 hour at room temperature, pressed to 2105 parts and thoroly shredded. The alkali cellulose so prepared was intimately mixed with a well-cooled solution of 2800 parts of p-toluenesulfonyl chloride in 6000 parts of toluene. The temperature was maintained below 30° C. for 12 hours, then raised to the boiling point for 45 minutes. The reaction mass was then filtered and the solid dissolved in acetone and filtered. The acetone solution was precipitated with ether, filtered, and washed with water until free of halogen. The ester so obtained is easily soluble in chloroform-alcohol, acetone, dioxane, pyridine, and benzyl alcohol and contains two ester groups per glucose unit.

This example illustrates the use of potassium hydroxide. This base reacts in most respects similarly to sodium hydroxide altho it appears to react somewhat more uniformly in this particular case.

Example 4

Four hundred parts of cellulose was impregnated with 483 parts of barium hydroxide and 717 parts of water. To this were added 1000 parts of toluene and 900 parts of p-toluenesulfonyl chloride. The mixture was heated at 100° C. for 18 hours, the solid filtered off, washed with ether, then with water until halogen free. The dry solid was then dissolved in acetone, filtered and the acetone solution precipitated with ether. The cellulose ester so obtained is soluble in the common organic solvents such as dioxane, acetone, chloroform-alcohol, benzyl alcohol, and pyridine, and contains 1.2 ester groups per glucose unit.

This example illustrates the possibility of using other bases than sodium hydroxide. A base such as Ba(OH)$_2$ has the advantage over sodium hydroxide for this type of reaction that it does not so strongly favor oxidation of the cellulose.

Example 5

Eighty-one parts of cellulose was steeped for 2 hours in 40% sodium hydroxide at 20° C. The cellulose was removed and pressed to 381 parts and carefully shredded for 2 hours. To the alkali cellulose thus prepared were added 1500 parts of dioxane and 475 parts of p-toluenesulfonyl chloride. The mixture was stirred with cooling for 12 hours, then heated to 100° C. for 13 hours. The solid was filtered off, washed with water, and, after drying, extracted with dioxane. The combined dioxane solutions were precipitated in ether and the solids collected and washed in water until neutral to phenolphthalein. The product thus obtained analyzed for 1.2 ester groups per glucose unit.

This example illustrates the possibility of using a solvent-diluent. In this case dioxane dissolves the ester as it is formed, thus making the remainder of the cellulose fiber available to the esterifying agent. This type of solvent-diluent makes it possible to add caustic and p-toluenesulfonyl chloride simultaneously until all of the cellulose fibers have been reacted upon. Thus, in one experiment 6.86 grams of fibrous cellulose p-toluenesulfonate, prepared by use of the nonsolvent toluene as a diluent and containing 0.73 ester groups, was mixed with 14.8 cc. 30% sodium hydroxide and 70 cc. dioxane, then 15.4 grams p-toluenesulfonyl chloride were added slowly in small portions. As soon as the caustic had all been consumed, 10 cc. of 30% sodium hydroxide were added and the viscous mixture stirred together with 6 grams of p-toluenesulfonyl chloride with cooling. The entire reaction product was dissolved in dioxane and was precipitated by methanol, washed, dried and found by analysis to contain 1.2 ester groups per glucose unit. The product was free from unreacted fibers.

Example 6

To 400 parts of cellulose were added 1000 parts of liquid ammonia and 135 parts of water. To this mixture was added 178 parts of metallic sodium. As soon as the blue color of the sodium had disappeared, liquid ammonia was distilled off and 10,000 parts of toluene added. The mixture was heated until all the ammonia had been driven off. As soon as the mixture had cooled to room temperature, 1420 parts of p-toluenesulfonyl chloride was added and the temperature maintained at about 12° C. for 4 hours, then the mixture was heated to 100° C. for 4 hours. The solid was filtered off, washed with ether until all the p-toluenesulfonyl chloride had been removed, then with water until all of the salt had been removed. The solid was dried and dissolved in acetone, filtered and the acetone extract precipitated with methyl alcohol. The solid was filtered off, dried, and found to contain 2 ester groups per glucose unit.

This example also illustrates the preparation of a new, intimate, dry mixture of sodium hydroxide and cellulose by use of cellulose, water, and sodium in liquid ammonia. The sodium reacts with the water in intimate contact with the cellulose and forms caustic, thus eliminating all water as such from the system. An intimate mixture of this composition can not be prepared in any other manner. Elimination of water from alkali cellulose by distilling off an azeotropic mixture falls far short of giving an anhydrous alkali cellulose or an alkali cellulose having so much alkali so uniformly and finely distributed throughout. In fact, a mixture such as is used in Example 1 cannot be made by use of azeotropic distillation methods. Other means of eliminating water such as use of sodium hydroxide will not remove last traces of water, nor will they yield intimate mixtures of caustic and cellulose such as are easily obtained by the present method.

Example 7

To 40 parts of cellulose contained in a suitable vessel were added 2000 parts of liquid ammonia and 26 parts of metallic sodium. The mixture was allowed to stand until the blue color of sodium had disappeared. Then the liquid ammonia was evaporated and 1000 parts of toluene added. After heating to 100° C. to remove last traces of ammonia, the mixture was cooled to room temperature and 220 parts of p-toluenesulfonyl chloride added. The temperature was maintained at about 20° C. for 4 hours, then raised to 100° C. for 8 hours. The solid was filtered off, washed with ether, then with water until halogen free. After drying, the reaction product was dissolved in acetone, filtered, and the acetone solution precipitated in water. The product contained about 1.5 ester groups per glucose unit.

The novelty of this example lies in the use of sodium cellulosate prepared from sodium in liquid ammonia reacting on cellulose. The excess of sodium used is sufficient to eliminate hygroscopic moisture by the formation of sodium hydroxide.

Example 8

Seventy-six parts of alkali cellulose containing 41.2% cellulose and 33.5% sodium hydroxide was mixed with 400 parts of toluene, 68 parts of water, and 906 parts of p-toluenesulfonyl chloride. The mixture was allowed to react at room temperature, then heated to 100° C. for 1 hour. The solid was filtered, washed first with ether, then with water until halogen free. The product was found to be completely soluble in acetone and to contain 1.2 ester groups per glucose unit.

This example illustrates the use of a large excess of p-toluenesulfonyl chloride acting on alkali cellulose. The ratio of p-toluenesulfonyl chloride to sodium hydroxide is 7.3:1.

This large excess of acid chloride insures a more uniform reaction than lower ratios and at the same time does not consume larger amounts of acid chloride since the excess may be recovered by the evaporation of the toluene solution. Toluene is not a solvent for the cellulose derivative under the conditions of the experiment. It has been found that about 7 mols of p-toluenesulfonyl chloride per mol. of caustic gives the maximum esterification, which represents not so much an increased rate of reaction as an increase in the difference between the rate of esterification and the rate of saponification represented in the equations given following Example 1.

As starting material any of the ordinary varieties of cellulose may be used, including wood pulp, cotton linters, hydrocellulose, oxycellulose, and the like. Also low substituted glycol cellulose, cellulose acetate, cellulose propionate, cellulose butyrate, cellulose glycollic acid, and other pretreated celluloses may be employed.

Inorganic halogen consuming bases may in general be used providing these react with hydrochloric acid to form essentially neutral salts. Thus, calcium hydroxide, sodium carbonate, potassium carbonate, calcium carbonate, magnesium oxide, magnesium hydroxide, and similar substances in addition to those disclosed in the examples may be used to maintain a solution at or near the neutral point during the reaction.

In the esterification of cellulose or cellulosic substances by the processes of the present invention, the temperature should be maintained below 30° C. until the esterification is almost complete. The temperature may then be raised to carry the reaction to completion and to promote solubility. In general, it is preferred that the temperature be lower than 25° C. at the start of the reaction altho the temperature may be raised later to as much as 120° C. to complete the reaction. Unless cooling is applied, the temperature may spontaneously rise to about 110° C. This is not desirable however, since the alkali and acid chloride are consumed without causing esterification of the cellulose.

The time of reaction depends upon the temperature chosen and on the proportion of reagents used, and may be conveniently determined by one skilled in the art. Suitable time of reaction depends in each case upon the degree of substitution desired and upon the solubility characteristics which are deemed necessary.

The proportions of reagents may be varied within rather wide limits. Thus, the quantity of organic sulfonyl halide, the quantity of base, the amount of water, the amount of diluent as well as the proportions of the various reagents to the reactive cellulose may be changed within the limits described above to suit the type of reaction products desired. By use of sodium in liquid ammonia, it is possible to vary the proportions of water and sodium hydroxide to cellulose in any desired manner. It is more advantageous to use mixtures of water and sodium in liquid ammonia than solid sodium hydroxide because the distribution of sodium hydroxide throughout the cellulose is far more complete and uniform.

Diluents may be used in all of the above reactions altho it is not strictly necessary. Thus, dioxane, nitrobenzene, toluene, chlorobenzene, chloroform, pentachlorethane, benzene, di-n-butyl ether, dibenzyl ether, acetone and the like may be employed.

The products may be fibrous in the reaction mixture or may be in solution depending upon the time, temperature, and amount of reagent used, and particularly upon the diluent employed.

While the examples disclose the use of p-toluenesulfonyl chloride and benzenesulfonyl chloride, the process of the present invention is in general applicable to organic sulfonyl halides and anhydrides. Thus, p-toluenesulfonic acid anhydride or benzenesulfonic acid anhydride may be used. Naphthalene-sulfonyl halides or anhydrides, xylenesulfonyl halides or anhydrides, and other aromatic sulfonyl halides and anhydrides may be employed. Methanesulfonyl chloride and other aliphatic sulfonyl halides may be substituted for the aromatic sulfonyl halides disclosed in the examples.

Purification of the sulfonate is readily effected with methanol but other liquids may be used, providing the p-toluenesulfonate is insoluble therein. Thus water, denatured alcohol, benzene, toluene, ethyl acetate, ether, and the like may be employed.

Organically substituted inorganic esters produced by this invention are particularly resistant to moisture, acids, alkalies and to other hydrolyzing media, thus making them useful for coatings, films, plastics, threads, and the like. They are also useful in securing non-inflammability and may be used in various compositions for this purpose. They may be used as intermediates in the formation of other cellulose derivatives.

Many other cellulose derivatives than organically substituted inorganic acid esters (sulfonates) can advantageously be prepared from the new, dry uniform alkali cellulose of Example 1. The alkali cellulose may be reacted under suitable conditions with for example benzyl chloride, dimethyl sulfate, diethyl sulfate, ethyl chloride, ethylene oxide, ethylene chlorhydrin, sodium chloroacetate, etc., to form the corresponding alkyl, aralkyl, hydroxyalkyl, carboxyalkyl, etc. ethers. Likewise, the alkali cellulose may be reacted with such acid chlorides as benzoyl and furoyl chlorides to form the corresponding cellulose esters.

Among the advantages in making cellulose derivatives generally from my new improved alkali cellulose, as compared to alkali cellulose used heretofore are a greater speed of reaction, the fact that a less amount of etherifying or esterifying agent is required, and the production of a uniformly substituted, uniformly soluble ester or ether.

The esters obtained according to the process of the present invention are novel in being soluble in organic solvents and in being highly esterified with organically substituted inorganic acid groups. The process disclosed is simple, economical of reagents, and convenient in operation.

The above description and examples are illustrative only. Any modification of or variation therefrom which conforms to the spirit of the invention is intended to be included within the scope of the claims.

I claim:

1. Process for the preparation of cellulose esters, which comprises reacting a substance having the cellulose nucleus and containing esterifiable hydroxyl groups, in the presence of at least one molal equivalent of inorganic base which will react with hydrochloric acid to form an essentially neutral salt per mol. of esterifiable hydroxyl and of not more than 20 mols of water per mol. of cellulosic substance, with at least one mol. of an organic esterifying agent taken from the class consisting of halides and anhydrides of organic sulfonic acids per equivalent of inorganic base at a temperature up to about 20° C. until the evolution of heat abates and then at an elevated temperature below 120° C.

2. Process for the preparation of cellulose esters, which comprises reacting a substance having the cellulose nucleus and containing esterifiable hydroxyl groups, in the presence of at least one molal equivalent of inorganic base which will react with hydrochloric acid to form an essentially neutral salt per mol. of esterifiable hydroxyl and of not more than 20 mols of water per mol. of cellulosic substance, with at least one mol. of an organic sulfonic acid halide per equivalent of inorganic base at a temperature up to about 20° C. until the evolution of heat abates and then at an elevated temperature below 120° C.

3. Process for the preparation of cellulose esters, which comprises reacting a substance having the cellulose nucleus and containing esterifiable hydroxyl groups, in the presence of at least one molal equivalent of inorganic base which will react with hydrochloric acid to form an essentially neutral salt per mol. of esterifiable hydroxyl and of not more than 20 mols of water per mol. of cellulosic substance, with at least one mol. of an organic sulfonic acid halide per equivalent of inorganic base at a temperature up to about 20° C. until the evolution of heat abates and then at an elevated temperature below 120° C. until an ester having more than one sulfonate radical per glucose unit is obtained.

4. Process for the preparation of cellulose esters, which comprises reacting a substance having the cellulose nucleus and containing esterifiable hydroxyl groups, in the presence of at least one equivalent of inorganic base which will react with hydrochloric acid to form an essentially neutral salt per mol. of esterifiable hydroxyl and of not more than 20 mols of water per mol. of cellulosic substance, in the presence of a solvent for the ester being formed, with at least one mol. of an organic sulfonic acid halide per equivalent of inorganic base at a temperature up to about 20° C. until the evolution of heat abates and then at an elevated temperature below 120° C. until an ester having more than one sulfonate radical per glucose unit is obtained.

5. Process for the preparation of cellulose esters, which comprises steeping cellulose in aqueous alkali, treating the product thereby produced with metallic sodium in the presence of liquid ammonia until a substantially dry product is obtained, removing said liquid ammonia by evaporation, and reacting the alkali cellulose thus obtained with an organic sulfonic acid halide in amount at least equivalent to the alkali present.

6. Process for the preparation of cellulose esters, which comprises suspending cellulose in liquid ammonia and water, adding metallic sodium in an amount equivalent to the water present, removing the ammonia, and reacting the alkali cellulose thus formed with an organic sulfonic acid halide.

7. A dry, reactive, undegraded alkali cellulose having the alkali intimately and uniformly dispersed throughout in a form approaching molecular, the form of the alkali being that obtainable by treating cellulose with an aqueous solution of alkali containing at least one mol. of alkali and at most 20 mols of water per mol. of cellulose on a $C_6H_{10}O_5$ basis, suspending the resultant in liquid ammonia, adding sufficient alkali metal to combine with all the water present, and finally evaporating the ammonia.

8. An alkali cellulose prepared by suspending cellulose in a solution containing liquid ammonia and water, adding metallic sodium in amount equivalent to the water present, and evaporating the ammonia.

9. An alkali cellulose prepared by steeping cellulose in aqueous alkali, treating the product thereby produced with metallic sodium in the presence of liquid ammonia until a substantially dry product is obtained, and evaporating the ammonia.

10. Process which comprises suspending cellulose in liquid ammonia and water, adding metallic sodium in an amount sufficient to react with the water, and evaporating the ammonia.

11. Process which comprises steeping cellulose in aqueous alkali, introducing in the presence of liquid ammonia metallic sodium in amount sufficient to react with the water present, and evaporating the ammonia.

12. Process which comprises steeping cellulose in aqueous alkali, introducing in the presence of liquid ammonia metallic sodium in amount sufficient to react with the water present, evaporating the ammonia, and reacting the alkali cellulose thereby produced with a member of the class consisting of organic etherifying and esterifying agents whereby to form a cellulose derivative in which at least one hydroxyl in each glucose unit is replaced by an organic radical.

13. Process which comprises suspending cellulose in liquid ammonia and water, adding metallic sodium in amount sufficient to react with the water, evaporating the ammonia and reacting the alkali cellulose thereby produced with a member of the class consisting of organic etherifying and esterifying agents.

14. The process which comprises steeping about 81 parts of cellulose for one hour at 20° C. in 40% sodium hydroxide, pressing to 374 parts, shredding to fine particles, mixing 16.2 parts of the resultant alkali cellulose with 100 parts of liquid ammonia to which has been added 2.23 parts of metallic sodium, evaporating the ammonia after the disappearance of the blue color of the metallic sodium, adding 100 parts of toluene, heating to 100° C. to drive off excess ammonia, cooling to 20° C., adding 52.2 parts of para-toluenesulfonyl chloride without allowing the temperature to rise above 30° C., maintaining a temperature of 100° C. for 5 hours after the exothermic part of the reaction is complete, pouring off the toluene, washing with diethyl ether to remove the remaining toluene and para-toluenesulfonyl chloride, washing with water until free from salt, drying, dissolving in acetone, filtering, precipitating with methyl alcohol, and drying the resultant solid.

15. The product obtainable by steeping about 81 parts of cellulose for one hour at 20° C. in 40% sodium hydroxide, pressing to 374 parts, shredding to fine particles, mixing 16.2 parts of the resultant alkali cellulose with 100 parts of liquid ammonia to which has been added 2.23 parts of metallic sodium, evaporating the ammonia after the disappearance of the blue color of the metallic sodium, adding 100 parts of toluene, heating to 100° C. to drive off excess ammonia, cooling to 20° C., adding 52.2 parts of para-toluenesulfonyl chloride without allowing the temperature to rise above 30° C., maintaining a temperature of 100° C. for 5 hours after the exothermic part of the reaction is complete, pouring off the toluene, washing with diethyl ether to remove the remaining toluene and para-toluenesulfonyl chloride, washing with water until free from salt, drying, dissolving in acetone, filtering, precipitating with methyl alcohol, and drying the resultant solid.

16. Process for the preparation of cellulose esters, which comprises reacting a substance having the cellulose nucleus and containing esterifiable hydroxyl groups, in the presence of at least one molal equivalent of inorganic base which will react with hydrochloric acid to form an essentially neutral salt per mol. of esterifiable hydroxyl and of not more than 20 mols of water per mol. of cellulosic substance, with at least one mol. of para-toluenesulfonyl chloride per equivalent of inorganic base at a temperature up to about 20° C. until the evolution of heat abates and then at an elevated temperature below 120° C.

17. The process which comprises reacting a substance having the cellulosic nucleus and containing esterifiable hydroxy groups, in the presence of about 11 mols of sodium hydroxide to about 8 mols of water to 1 mol. of cellulose, with at least 1 mol. of an organic esterifying agent taken from the class consisting of halides and anhydrides of organic sulfonic acids per mol. of sodium hydroxide at a temperature between about —10° and +25° C. until the evolution of heat abates and then at an elevated temperature below 120° C.

18. Substantially undegraded acetone soluble sulfonic acid esters of cellulose containing from 1 to 2 ester groups per glucose unit and being further characterized in that all of the ester groups attached to the cellulose molecule are paratoluene sulfonic acid groups.

GEORGE W. RIGBY.